United States Patent [19]

Egan, Jr. et al.

[11] 4,108,591

[45] Aug. 22, 1978

[54] LASER COMBUSTOR APPARATUS

[75] Inventors: William J. Egan, Jr., Lake Park; Lloyd M. Mazer, Palm Beach Gardens, both of Fla.

[73] Assignee: United Technologies Corporation, Hartford, Conn.

[21] Appl. No.: 754,771

[22] Filed: Dec. 27, 1976

[51] Int. Cl.² ............................................... H01S 3/01
[52] U.S. Cl. .................................... 431/121; 431/352; 331/94.5 G
[58] Field of Search ....................... 431/353, 121, 352; 331/94.5 G

[56] References Cited

U.S. PATENT DOCUMENTS

| | | | |
|---|---|---|---|
| 3,545,903 | 12/1970 | McCullough | 431/353 |
| 3,779,695 | 12/1973 | Chamberlain | 431/351 |
| 3,959,741 | 5/1976 | Meinzer | 331/94.5 G |
| 3,999,935 | 12/1976 | Stabinsky et al. | 431/121 |

*Primary Examiner*—Carroll B. Dority, Jr.
*Attorney, Agent, or Firm*—Jack N. McCarthy

[57] ABSTRACT

A laser combustor apparatus for a chemical laser including an injector and transition manifold wherein the injector has a barrier area located between the oxidizer plenum and fuel plenum and a coolant area is located between the fuel plenum and a porous injector face plate, said barrier area and coolant area being connected by a restricted passage to control the pressure in the barrier area maintaining it higher than that in the oxidizer or fuel plenum. The combustor and manifold form a T-shape and have a liner fixed therein with a spaced relationship into which a diluent is placed for a purge thereof to keep combustion products from getting behind the liner.

6 Claims, 4 Drawing Figures

LASER COMBUSTOR APPARATUS

BACKGROUND OF THE INVENTION

This invention relates to combustor apparatus for lasers and more particularly to chemical lasers. Other lasers combustor apparatus is shown in the following patents: U.S. Pat. No. 3,779,695 and U.S. Pat. No. 3,688,215. A nozzle array into which a combustor apparatus can discharge is shown in U.S. Pat. No. 3,602,432.

SUMMARY OF THE INVENTION

A primary object of the present invention is to provide a combustion apparatus which will provide a gaseous mixture of uniform temperature and homogenous composition, by combusting an oxidizer, fuel and diluent, to a nozzle array for use in a laser.

In accordance with the present invention, the injector includes a barrier area between the oxidizer plenum and fuel plenum, said barrier area being connected to a coolant area adjacent a porous injector face plate. The connection between the barrier area and coolant area has a restriction to control the pressure in the barrier area to maintain the pressure higher than the pressure in the oxidizer plenum and fuel plenum.

In accordance with a further aspect of the invention, the combustor and transition manifold have a liner spaced from an outer pressure housing to provide a construction of light weight, low cost, and low heat loss; the space is purged to prevent combustion products from accumulating behind the liner to react with the pressure shell.

BRIEF DESCRIPTION OF THE DRAWINGS

FIG. 4 is an enlarged view of a projection supporting a porous faceplate.

DESCRIPTION OF THE PREFERRED EMBODIMENT

Figure 1:
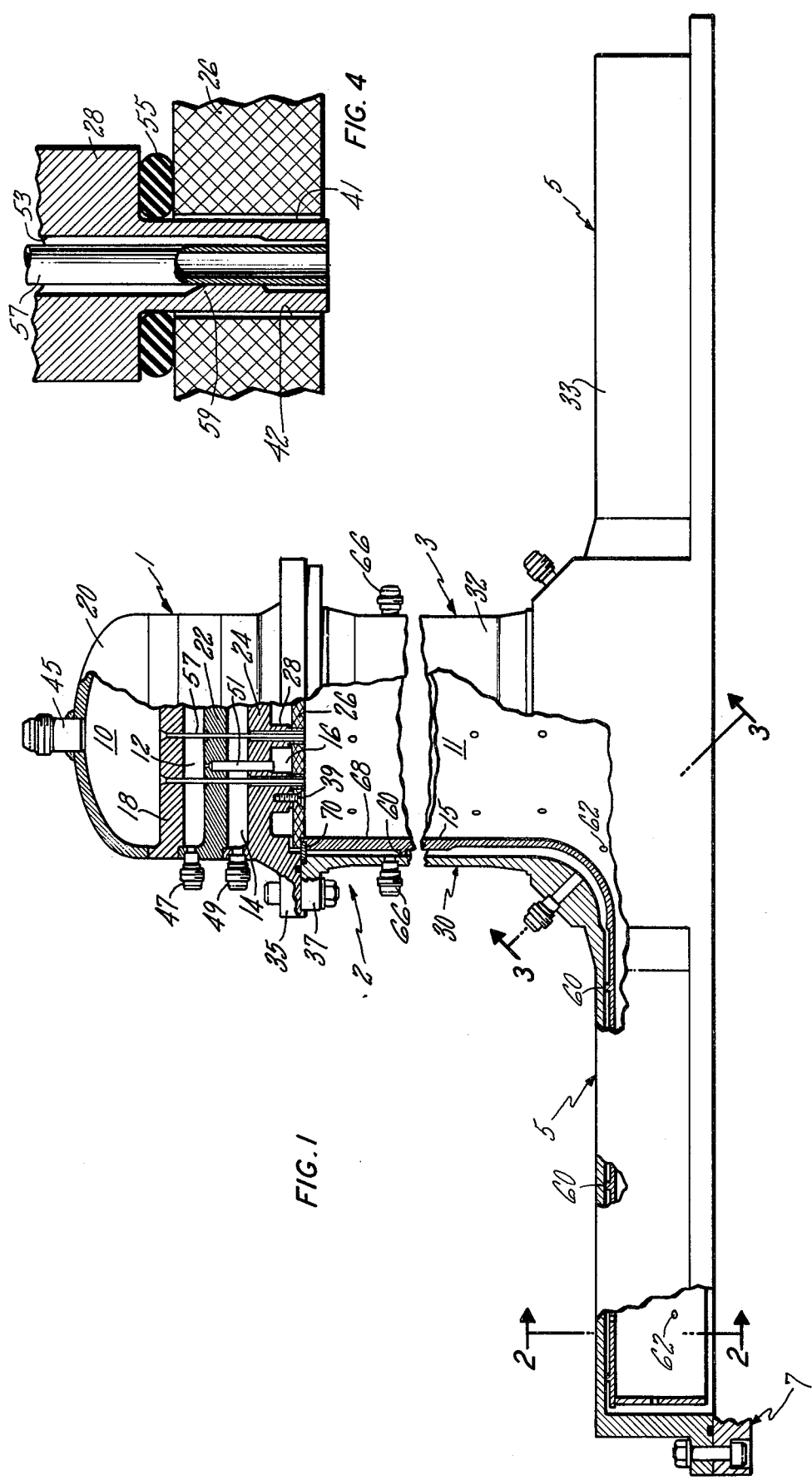
FIG. 1 is a plan view of the laser combustor apparatus with a portion in section.

Referring to FIG. 1, a combustor apparatus 2 is shown having an injector 1, a combustor 3, and a transition manifold 5. A nozzle array 7 is connected downstream of the manifold 5 and an optical cavity 9 is in turn connected downstream of the nozzle array 7. Specific nozzle array configurations and optical chambers are shown in the prior art.

The injector 1 is formed cylindrical in shape and has four plenum chambers 10, 12, 14 and 16 extending along its length. The chambers are formed between an axially aligned circular dome 20, three spaced circular plates 18, 22 and 24, and a circular porous plate 26. Chamber 10 is formed between the dome 20 and circular plate 18 by the shape of the dome and a short axially extending annular flange on plate 18; chamber 12 is formed between circular plate 18 and circular plate 22 by an axially extending annular flange on plate 22, chamber 14 is formed between circular plate 22 and circular plate 24 by an axially extending annular flange on plate 24, and chamber 16 is formed between circular plate 24 and the circular porous plate 26 by an axially extending annular flange on plate 24 and a plurality of projections 28 for a purpose to be hereinafter described. The dome 20 and plates 18, 22 and 24 are fixed together by being welded, plate 24 has a radially extending flange 35 for attachment to a radially extending flange 37 on the combustor 3. The porous plate 26 is fixed to the end face of six enlarged projections 28 by screws 39.

Chamber 10 has a supply of oxidizer (i.e. fluorine) directed thereto through a fitting 45. The chamber 12 is a barrier chamber between chambers 10 and 14 and has a supply of diluent (i.e. helium) directed thereto through a fitting 47. Chamber 14 has a supply of fuel (i.e. hydrogen) directed thereto through a fitting 49. Chamber 16 is connected to chamber 12 by a plurality of tubular means 51. Each tubular member 51 has one end positioned in an opening in plate 22 adjacent chamber 14 and has its other end extending through plate 24 into chamber 16. The plate 22 has a small opening therethrough axially aligned with each member 51 to provide a restrictive orifice between chambers 12 and 16 for a purpose to be hereinafter set forth.

Chamber 14 directs fuel therefrom into the combustion zone 11 of the combustor 3 through a plurality of longitudinal cylindrical openings 53 (see FIG. 4), each opening 53 extending through a projection 28 on plate 24. The free end of the projections 28 has a necked-down portion 41 at the end thereof which fits into a cooperating opening 42 in the porous plate 26 to position it. When the porous plate 26 has been positioned, the screws 39 are then put in place. To prevent leakage from chamber 16 between the projections 28 and openings in the porous faceplate 26, packing members shaped as 0-rings 55 are placed at the bottom of the necked-down portion (see FIG. 4). Chamber 10 directs an oxidizer therefrom into the combustion zone 11 of the combustor 3 through a plurality of tubes 57, each tube extends through a cooperating longitudinal cylindrical opening 53 in plate 24 and projections 28. The free end of each tube 57 is guided by a group of three projections 59 which extends from the inner side of the longitudinal cylindrical opening 53.

Figure 2:
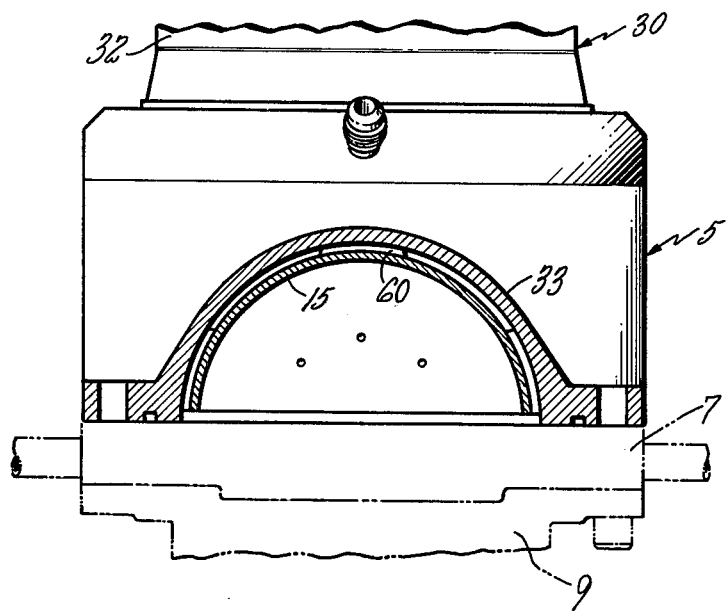
FIG. 2 is a view taken along the line 2—2 of FIG. 1.
Figure 3:
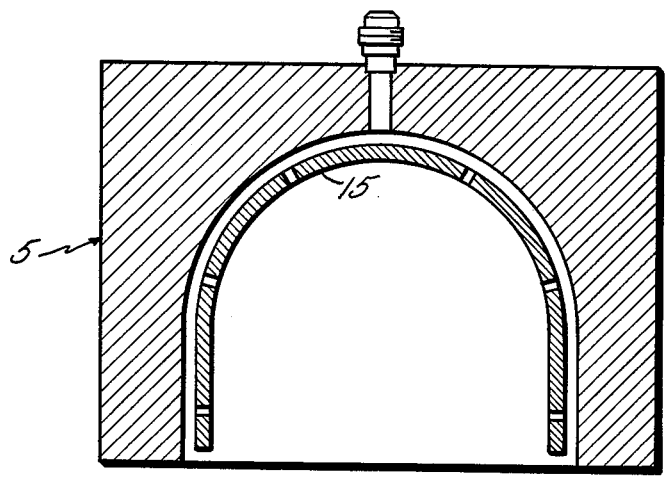
FIG. 3 is a view taken along the line 3—3 of FIG. 1.

The combustor 3 and transition manifold 5 are formed of an outer pressure shell or housing 30 which includes a cylindrical section 32 for the combustor and a transverse section 33 attached to the free end thereof for the manifold. The housing portion of the manifold is formed for a long section of semicircular cross section (see FIG. 2). This transverse section 33 is attached to the cylindrical section 32 forming a T-shape member. A liner 15 also of T-shape is located within the cylindrical section 32 and transverse section 33. Standoff members 60 located around the exterior of the liner space it from the cylindrical section 32 and transverse section 33. A plurality of openings 62 are located throughout the liner to permit the space to be purged. Fittings 66 are located in the wall of the cylindrical section 32 to direct a purging fluid to the space.

In assembling the combustor 3 and transition manifold 5, the liner 15 is positioned in the cylindrical section 32 and transverse section 33 with the standoffs 60 properly positioning them, with the free end of the cylindrical section 32 being located adjacent the free end of the mating portion 68 of liner 15. When these members are so positioned, a ring 70 is placed in two peripheral grooves formed on the facing adjacent ends of cylindrical section 32 and mating portion 68. The ring is then welded to the liner 15 fixing the assembly together. When the flanges 35 and 37 are bolted together, the free end of the portion 68 of liner 15 in the adjacent edge of ring 70 contacts the outer periphery of the porous faceplate 26. The outer periphery of the ring 70 is clamped between the cylindrical section 32 and the inner edge of the annular flange on plate 24.

This construction provides for the use of a large amount of diluent for premixing with the fuel. The amount of diluent used is approximately 50% to 80% of the amount of oxidizer flow by volume. While the major portion of the diluent, helium being used in a construction built, is mixed with the fuel, the remainder is used for faceplate cooling and liner purge flow. In a study made, it showed that 10% of the diluent flow could be used to cool the faceplate, with 80% mixed with the fuel, and 10% used for the liner purge. Other injectors would, of necessity, require some other percentages of diluent division directed to the fuel, faceplate, and for liner purge.

We claim:

1. A laser combustor apparatus including an injector, a combustor and a transition manifold, said injector having a plurality of aligned chambers, an oxidizer chamber, a barrier chamber, a fuel chamber, a coolant chamber, said coolant chamber having a porous wall, said wall facing said combustor, conduit means connecting said barrier chamber to said coolant chamber, restriction means for maintaining the pressure in said barrier chamber higher than the pressure in said oxidizer and fuel chambers, second conduit means connecting said fuel chamber to said combustor through said porous wall, third conduit means connecting said oxidizer chamber through said barrier chamber and fuel chamber and directed through the center of said second conduit means to said combustor.

2. A combination as set forth in claim 1 wherein said injector is cylindrical and said chambers are aligned along the length of the cylinder, said chambers being separated by circular plate means.

3. A combination as set forth in claim 1 wherein said transition manifold is connected to the downstream end of said combustor, said transition manifold having an elongated outlet for connection to a nozzle array.

4. A combination as set forth in claim 1 wherein said combustor and transition manifold include a liner spaced from an outer housing, means for purging the space between said liner and outer housing to prevent products of combustion from entering.

5. A combination as set forth in claim 4 including a supply of diluent, said supply of diluent being connected to said barrier chamber for passing through said restriction means to said coolant chamber and through said porous wall.

6. A combination as set forth in claim 5 including a supply of fuel connected to said fuel chamber, means for directing said diluent to the space between said liner and outer housing.

* * * * *